United States Patent [19]

May, Jr. et al.

[11] 4,104,198

[45] Aug. 1, 1978

[54] HIGH YIELD COMPLEX CATALYST FOR POLYMERIZING OLEFINS

[75] Inventors: James A. May, Jr.; Wilbur L. Bressler, both of Lake Jackson, Tex.

[73] Assignee: The Dow Chemical Company, Midland, Mich.

[21] Appl. No.: 705,311

[22] Filed: Jul. 14, 1976

[51] Int. Cl.$^2$ ............................................. B01J 31/02
[52] U.S. Cl. ........................... 252/429 B; 252/429 C; 526/137; 526/144; 526/151; 526/161
[58] Field of Search ........................ 252/429 B, 429 C

[56] References Cited

U.S. PATENT DOCUMENTS

| | | | |
|---|---|---|---|
| 3,318,860 | 5/1967 | Elchenbaum | 252/429 B X |
| 3,403,197 | 9/1968 | Seelbach et al. | 252/429 A X |
| 3,634,340 | 1/1972 | Günther et al. | 252/429 B X |
| 3,769,373 | 10/1973 | Reed et al. | 252/429 C X |
| 3,784,481 | 1/1974 | Lassau et al. | 252/429 B X |

OTHER PUBLICATIONS

Bioinorganic Chemistry, Advances in Chemistry Series 100, 79 (1971) Allen, pp. 79–94.
Chemical Reviews, 7311 (1973) Allen et al., pp. 11–20.
Bioinorganic Chemistry, Advances in Chemistry Series 100, 95 (1971), "Fixation of Molecular Nitrogen Under Mild Conditions, pp. 95–100.

*Primary Examiner*—Patrick P. Garvin
*Assistant Examiner*—William G. Wright
*Attorney, Agent, or Firm*—Michael S. Jenkins; James G. Carter

[57] ABSTRACT

Compositions exhibiting high catalytic activity in the polymerization of α-olefins are provided by reacting a dinitrogen and/or dihydrogen complex of a transition metal such as titanium with an organometallic compound of a divalent metal such as dihydrocarbyl magnesium or hydrocarbyl magnesium halide and a halide source such as alkyl aluminum halide. Polymerization processes employing this catalyst composition do not require conventional catalyst removal steps in order to provide polymers having suitable color and other physical characteristics.

10 Claims, No Drawings

HIGH YIELD COMPLEX CATALYST FOR POLYMERIZING OLEFINS

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene, and 1-butene can be polymerized in the presence of metallic catalysts, particularly the reaction products of organometallic compounds and transition metal compounds to form substantially unbranched polymers of relatively high molecular weight. Typically such polymerizations are carried out at relatively low temperatures and pressures. The resulting generally linear olefin polymers are characterized by greater stiffness and higher density than olefin polymers having highly branched polymer chains.

Among the methods for producing linear olefin polymers, some of the most widely utilized are those described by Professor Karl Ziegler in U.S. Pat. No. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides and oxyhalides of titanium, vanadium and zirconium are the most widely used transition metal compounds. Outstanding examples of the organometallic compounds include hydrides, alkyls and haloalkyls of aluminum, alkyl aluminum halides, Grignard reagents, alkali metal aluminum hydrides, alkali metal borohydrides, alkali metal hydrides, alkaline earth metal hydrides and the like.

Usually, polymerization is carried out in a reaction medium comprising an inert organic liquid, e.g., an aliphatic hydrocarbon, and the aforementioned catalyst. One or more olefins may be brought into contact with the reaction medium in any suitable manner, and a molecular weight regulator, which is normally hydrogen, is usually present in the reaction vessel in order to suppress the formation of undesirably high molecular weight polymers.

Following polymerization, it is common to remove catalyst residue from the polymer by separating the polymer from the inert liquid diluent and then repeatedly treating the polymer with an alcohol or similar deactivating agent. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalyst to become rapidly depleted or deactivated by significantly higher temperatures than are normally employed in solution processes.

In view of the expense of removing catalyst residues from the polymer, it would be highly desirable to provide a polymerization catalyst which is sufficiently active, even at solution polymerization temperatures, to produce such high quantities of polymer per unit of catalyst that it is no longer necessary to remove catalyst residue in order to obtain polymer of the desired purity.

SUMMARY OF THE INVENTION

The present invention, in one aspect, is a catalyst composition which is the catalytic reaction product of (a) a dinitrogen and/or dihydrogen complex of a transition metal wherein the complex contains at least one coordinate covalent bond to molecular nitrogen or molecular hydrogen, (b) an organometallic component containing a divalent, non-transition metal, and (c) a halide source. The proportions of the foregoing components in said catalytic reaction product are such that the atomic ratio of divalent metal to transition metal is within the range from about 10:1 to about 2000:1, and the atomic ratio of divalent metal to halide is within the range from about 0.1:1 to about 2.5:1.

In a second aspect, the invention is a process for polymerizing an α-olefin under conditions characteristic of Ziegler polymerization wherein the aforementioned reaction product is employed as the transition metal component.

Surprisingly, it is found that the foregoing reaction product is a high efficiency catalyst capable of producing 100,000 pounds up to one million pounds or more of olefin polymer per pound of transition metal in the catalyst. Accordingly, olefin polymers produced in accordance with the foregoing process generally contain lower amounts of catalyst residues than polymers produced in the presence of conventional catalysts and subsequently subjected to catalyst removal treatments. In addition it is found that the polymers produced in the practice of many embodiments of the present invention have narrow molecular weight distributions, i.e., $I_{10}/I_2 < 7$ wherein $I_{10}$ and $I_2$ are defined in ASTM D-1238-65T. Such polymers are therefore highly useful in molding applications such as injection molding, film application and rotational molding.

DETAILED DESCRIPTION OF THE EMBODIMENT

The present invention is most advantageously practiced in a polymerization process wherein an α-olefin is polymerized, generally in the presence of hydrogen, in a polymerization zone containing an inert diluent and the catalytic reaction product described herein. The foregoing polymerization process is most beneficially carried out under inert atmosphere and at relatively low temperature and pressure, although very high pressures are optionally employed.

Olefins which are suitably polymerized or copolymerized in the practice of this invention are generally the α-olefins having from 2 to 18 carbon atoms. Illustratively, such α-olefins include ethylene, propylene, butene-1, pentene-1, 3-methylbutene-1, hexene-1, octene-1, dodecene-1, octadecene-1 and the like. It is understood that α-olefins may be copolymerized with other α-olefins and/or with small amounts, i.e., up to about 10 weight percent based on the polymer, of other ethylenically unsaturated monomers such as butadiene, isoprene, 1,3-pentadiene, 1,7-octadiene, styrene, α-methyl styrene and the like.

Most advantageously, in the novel catalyst compositions of the present invention the atomic ratio of divalent metal to transition metal is preferably in the range from about 10:1 to about 200:1, most preferably from about 20:1 to 100:1. Also in such catalyst compositions, it is most advantageous if sufficient aluminum is present in the composition to provide an atomic ratio of aluminum to transition metal of at least 4:1, preferably in the range from about 10:1 to about 500:1, and most preferably from about 20:1 to 100:1. The atomic ratio of divalent metal to halide is advantageously in the range from about 0.1:1 to about 2.5:1, preferably from about 0.2:1 to about 0.7:1 and most preferably from about 0.3:1 to about 0.5:1.

The dinitrogen complex of the transition metal is broadly characterized as a complex comprising a transition metal, anionic groups sufficient to render the complex electrically neutral and molecular hydrogen and/or molecular nitrogen. With the exception of divalent nickel compounds, the transition metal of the complex preferably has an oxidation state or valence greater than two. In all of these complexes, the molecular nitrogen and/or molecular hydrogen forms a coordinate covalent bond with the transition metal. Due to the high reactivity and instability of the dinitrogen complexes under conditions required for detailed structural analysis, such complexes are not characterized further as to structure. In preferred complexes, however, it is believed that the ratio of transition metal atoms to molecular nitrogen and/or molecular hydrogen is from about 1:0.3 to about 1:3, more preferably from about 1:1 to about 1:3, and most preferably about 1:1. The atomic ratio of transition metal atoms to anionic groups is sufficient to render the complex electrically neutral, preferably from about 1:2 to about 1:4, most preferably about 1:3. Such complexes are generally soluble in hydrocarbon solvents and should be maintained under an atmosphere of nitrogen, hydrogen or mixture thereof depending upon whether molecular nitrogen, molecular hydrogen or combination thereof is part of the complex. For example, a complex comprising molecular nitrogen and not molecular hydrogen is preferably kept under a nitrogen atmosphere.

Representative transition metals advantageously employed in the dinitrogen complex include the metals of Groups 4b, 6b, 7b and 8 of Mendeleev's Periodic Table of Elements as set forth in *Handbook of Chemistry and Physics*, CRC, 48th Edition (1967–1968). Exemplary metals are titanium, zirconium, tungsten, manganese, molybdenum, ruthenium, rhodium, cobalt, nickel and platinum, with titanium and zirconium being preferred and titanium being most preferred.

The anionic groups of the complex are preferably halide, especially chloride or bromide, with chloride being most preferred.

The dinitrogen complex is most advantageously prepared by reacting molecular nitrogen or molecular hydrogen with a transition metal compound, preferably transition metal halides, in the absence of a reducing agent. Exemplary transition metal halides are the chlorides, bromides, iodides and fluorides of the aforementioned transition metals, with the chlorides and bromides being preferred and the chlorides being most preferred. In the most advantageous embodiments, the transition metal compound is insoluble in hydrocarbon diluents and is rendered soluble by the formation of the dinitrogen complex. Exemplary preferred transition metal compounds are titanium trichloride, zirconium tetrachloride, tungsten hexachloride, nickel dichloride, with the halides, particularly the chlorides, of titanium being especially preferred.

The reaction to form the complex is preferably carried out in an inert organic diluent such as an aliphatic or aromatic hydrocarbon or halohydrocarbon at temperatures in the range from about 25° C to about 200° C by pressuring nitrogen or hydrogen gas into a reactor containing the transition metal compound dispersed in the organic diluent. Examples of suitable organic diluents include hexane, octane, nonane, decane, cyclohexane, benzene, 2,2,5-trimethyl hexane and mixtures thereof. Pressures usually employed in the reaction range from about 40 to about 300 pounds per square inch gauge (psig), preferably from about 40 to 300 psig, with nitrogen and/or hydrogen gas constituting at least 10 mole percent of the gas phase, preferably from about 50 to 100 mole percent and most preferably from about 90 to 100 mole percent. Although concentration of the transition metal compound in the inert diluent is not particularly critical, it is generally desirable to employ concentrations in the range from about 0.1 to about 10, preferably from about 1 to 10, weight percent of transition metal compound in the inert diluent.

In cases wherein the transition metal compound is insoluble in the organic diluent, it is desirable to agitate the reaction mixture during the reaction to maintain the insoluble compound dispersed in the diluent. In all cases, agitation is a desirable practice since it promotes contact between the molecular nitrogen and/or hydrogen and the transition metal compound.

In especially preferred embodiments, a Friedel-Crafts catalyst is employed, usually in amounts from about 5 to about 50 weight percent based on the transition metal halide, to accelerate the reaction and to increase yield of dinitrogen complex. Examples of preferred Friedel-Crafts catalysts for this purpose include aluminum trichloride and aluminum trifluoride.

The time required to form significant amounts of the dinitrogen complex varies with the conditions of the reaction as well as the particular transition metal compound. Generally a reaction time in the range from about 1 to about 8 hours is sufficient.

The hydrocarbon-soluble dinitrogen complex is then recovered in the supernatant phase from the reaction mixture by decanting the supernatant of the reaction mixture from the insoluble transition metal residues and/or by filtering the solid residue and recovering the filtrate.

Suitable divalent organometallic compounds include Group 2a and 2b metal alkyls or aryls such as dialkyls, diaryls or arylalkyls of magnesium, zinc, cadmium or calcium; Group 2a and 2b metal alkyl or aryl hydrides of divalent metals such as magnesium alkyl hydrides, magnesium aryl hydrides, calcium alkyl hydrides, zinc alkyl hydrides and cadmium alkyl hydrides; alkyl or aryl metal halides (particularly chlorides and bromides) such as aryl magesium halides, alkyl magnesium halides, alkyl zinc halides, and alkyl cadmium halides; aryloxides and alkoxides of Group 2a and 2b metals of Mendeleev's Periodic Table of the Elements such as magnesium, calcium, zinc and the like. Of the foregoing, the magnesium dialkyls and magnesium diaryls are preferred, with the magnesium dialkyls being more preferred. Additionally, the organomagnesium compounds are generally preferred over the organometallic compounds of the other Group 2a or 2b metals.

Examples of the more preferred magnesium dialkyls include dibutylmagnesium (most preferably di-n-butylmagnesium and n-butyl s-butylmagnesium), dipropylmagnesium, diethylmagnesium, dihexylmagnesium, propyl butylmagnesium and others wherein alkyl has from 1 to 20 carbon atoms. Exemplary magnesium diaryls include diphenylmagnesium, dibenzylmagnesium, and ditolylmagnesium.

In especially preferred practices of this invention, a hydrocarbon-soluble complex of one of the foregoing preferred organomagnesium compounds is employed as the divalent organometallic component. The organomagnesium complex, empirically illustrated as $MgR_2''\cdot xM'R_y''$ wherein R'' is hydrocarbyl, M' is aluminum, zinc or mixtures thereof and $x$ is about 0.01 to 10, especially from about 0.1 to about 2.5, and $y$ denotes the number of hydrocarbyl groups which corresponds to the valence of M'.

As used herein, hydrocarbyl is a monovalent hydrocarbon radical. Preferably, hydrocarbyl is alkyl, cycloalkyl, aryl, aralkyl, alkenyl and similar hydrocarbon radicals having 1 to 8 carbon atoms, with alkyl having 1 to 4 carbon atoms being especially preferred.

The organomagnesium complex is prepared by reacting particulate magnesium such as magnesium turnings or magnesium particles with about a stoichiometric amount of hydrocarbyl halide. The resulting $MgR_2''$, which is usually insoluble in hydrocarbon, is then solubilized by adding $M'R_y''$ such as $AlR_3''$ or mixtures thereof with $ZnR_2''$ hydrocarbon-soluble organomagnesium complex. The amount of $M'R_y''$ which is added to the $MgR_2''$ to form the organomagnesium complex should be enough to solubilize a significant amount of $MgR_2''$, e.g., at least 5 weight percent of $MgR_2''$ is solubilized. It is preferred to solubilize at least 50 weight percent of the $MgR_2''$ and especially preferred to solubilize all of $MgR_2''$. When a mixture of $AlR_3$ and $ZnR_2$ are employed to solubilize $MgR_2$, the atomic ratio of Zn to Al is in the range from about 3000:1 to about 0.1:1, preferably from about 350:1 to about 1:1. In suitable complexes, organometallic compounds (other than $AlR_3''$, $ZnR_2''$ or mixtures thereof) which also solubilize the organomagnesium compound in hydrocarbon are employed in beneficial amounts, usually an amount sufficient to produce an atomic ratio of 0.01:1 to 10:1 of metal of the organometallic compounds to magnesium. Examples of such other organometallic compounds include boron trialkyls such as boron triethyl, alkyl silanes such as dimethyl silane and tetraethyl silane, alkyl tin and alkyl phosphorus compounds.

While an amount of $AlR_3''$ in excess of that required to solubilize all of $MgR_2''$ may be added, no further advantage is realized by doing so. In fact, to obtain maximum catalyst efficiency at polymerization temperatures above 180° C, it is desirable to minimize the amount of aluminum in the complex as well as in the total catalyst. Accordingly, for catalysts having Al:transition metal atomic ratios less than 120:1, it is desirable to have an Mg:Al atomic ratio more than 0.3:1, preferably from about 0.5:1 to 10:1.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, $\alpha$-phenylethyl bromide, diphenyl methyl chloride and the like. Most preferred are hydrogen chloride, t-butyl chloride, allyl chloride, and benzyl chloride.

Also suitable as the halide source are metallic halides represented by the formula $MR_{y-a}X_a$ wherein M is a metal of Group 3a or 4a, including boron, of Mendeleev's Periodic Table of Elements, R is a monovalent organic radical, X is halogen, $y$ corresponds to valence of M and $a$ is a number from 1 to $y$. Advantageously, the metallic halides are alkylaluminum halides of the formula $AlR_{3-a}X_a$ wherein R is alkyl, and X and $a$ are as defined hereinbefore. Exemplary preferred alkylaluminum halides are ethylaluminum sesquichloride, diethylaluminum chloride, ethylaluminum dichloride, and diethylaluminum bromide, with ethylaluminum sesquichloride and ethylaluminum dichloride being especially preferred. Alternatively, a metallic halide such as aluminum trichloride or a combination of aluminum trichloride with an alkyl aluminum halide or a trialkyl aluminum compound may be suitably employed.

It is understood that the organic moieties of the aforementioned organomagnesium component, i.e., R'', and the organic moieties of the halide source, i.e., R and R', are suitably any other organic radical provided that it does not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalytic reaction product is prepared by mixing the components of the reaction product in an inert liquid diluent in the preferred especially preferred order: (1) halide source, e.g., ethylaluminum dichloride; (2) transition metal complex, e.g., titanium complex; and (3) divalent metal compound, e.g., dialkyl magnesium. Somewhat less preferred are the following orders of addition: (1) halide source, (2) divalent metal compound, and (3) transition metal complex; (1) divalent metal compound, (2) halide source and (3) transition metal complex; or (1) transition metal complex, (2) halide source and (3) divalent metal compound. Suitable, but least preferred, are the following orders of addition: (1) divalent metal compound, (2) transition metal complex and (3) halide source; (1) transition metal complex, (2) divalent metal compound and (3) halide source; or simultaneous of addition of the three components. In any case in order to obtain a catalyst of highest efficiency, it is generally desirable to avoid contact between dinitrogen complex and the divalent organometallic compound or complex prior to reaction with an organometallic compound of a Group 3a metal such as alkyl aluminum halide or trialkylaluminum. The reaction between the divalent organometallic compound and the organometallic halide or metallic halide causes the formation of a finely divided insoluble material. This intermediate reaction product now contains hydrocarbon insoluble portions as well as soluble portions. In the especially preferred practices, the amount of halide added to the organomagnesium complex is sufficient to provide an atomic ratio of Mg:X of from about 0.1 to about 10.0, preferably from about 0.2 to about 0.7 and especially from about 0.3 to about 0.5.

In cases wherein neither the organomagnesium component nor the halide source contains aluminum, it is generally desirable to include in the total catalyst an aluminum compound such as an alkyl aluminum compound, e.g., a trialkyl aluminum, an alkyl aluminum halide or an aluminum halide in an amount sufficient to provide an Al:transition metal ratio as described hereinbefore. When the catalytic reaction product is employed in polymerizations operating at temperatures above 180° C, the aluminum compound is used in proportions such that the divalent metal:Al ratio is more than 0.3:1, preferably from 0.5:1 to 10:1, and Al:transition metal ratio is less than 120:1, preferably less than 40:1. It is understood, however, that the use of such very low amounts of aluminum necessitates the use of high purity solvents or diluents in the polymerization zone. Further, other components present in the zone should be essentially free of impurities which react with aluminum alkyls. Otherwise, additional organoaluminum is desirably employed to react with such impurities.

In the preparation of the catalyst composition by any of the foregoing orders of addition, it is preferred to carry out such preparation in the presence of an inert diluent. By way of an example of suitable inert organic diluents can be mentioned liquefied ethane, propane, isobutane, n-butane, n-hexane, the various isomeric hexanes, isooctane, paraffinic mixtures of alkanes having from 8 to 9 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about $-50°$ C to about 200° C. Also included as suitable inert diluents are benzene, toluene, ethylbenzene, cumene, decalin and the like.

Mixing of the catalyst components to provide the desired catalyst composition is advantageously carried out under an inert atmosphere such as nitrogen, argon or other inert gas at temperatures in the range from about $-100°$ C to about 200° C, preferably from about $-20°$ C to about 50° C. The concentrations of catalyst components in the inert diluent are preferably such that when the three essential components of the catalyst compositions are combined, the resulting slurry is from about 0.001 to about 1.5 molar (moles/liter) with respect to magnesium. The period of mixing is not considered to be critical as it is found that a sufficient catalyst composition most often occurs within about 5 minutes or less.

In the polymerization process employing the aforementioned catalyst composition, polymerization is effected by adding a catalytic amount of the above catalyst composition to a polymerization zone containing α-olefin monomer, or vice versa and maintained at temperatures in the range from about 0° to about 300° C, preferably at solution polymerization temperatures, e.g., from about 110° to about 300° C for a residence time of about 10 minutes to several hours, preferably 15 minutes to 1 hour. It is generally desirable to carry out the polymerization in the absence of moisture and oxygen and a catalytic amount of the catalyst composition. A catalytic amount is generally within the range from about 0.0001 to about 0.01 milligram-atoms titanium per liter of diluent in polymerization reactor. It is understood, however, that the most advantageous catalyst concentration will depend upon polymerization conditions such as temperature, pressure, solvent and presence of catalyst poisons and that the foregoing range is given to obtain maximum catalyst yields. Generally in the polymerization process, a carrier which may be an inert organic diluent or solvent or excess monomer is generally employed. In order to realize the full benefit of the high efficiency catalyst of the present invention care must be taken to avoid over saturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture. Inert diluents employed in the polyermization recipe are suitably as defined as hereinbefore.

The polymerization pressures usually employed are relatively low, e.g., from about 100 to about 500 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

Hydrogen is often employed in the practice of this invention to lower molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contracted with the catalyst composition in any conventional manner, preferably by bringing the catalyst composition and monomer together with intimate agitation provided by suitable stirring or other means. Agitation can be continued during polymerization, or in some instances, the polymerization can be allowed to remain unstirred while polymerization takes place. In the case of more rapid reactions with more active catalysts, means can be provided for refluxing monomer and solvent, if any of the latter is present and thus remove the heat of reaction. In any event, adequate means should be provided for dissipating the exothermic heat of polymerization. If desired, the monomer can be brought in the vapor phase into contact with the catalyst composition, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. The resultant polymer is found to contain insignificant amounts of catalyst residue and to possess a very narrow molecular weight distribution.

The following examples are given to illustrate the invention, and should not be construed as limiting its scope. All parts and percentages are by weight unless otherwise indicated.

GENERAL OPERATING PROCEDURE FOR WORKING EXAMPLES

In the following examples the catalyst preparations are carried out in the absence of oxygen or water in a nitrogen or hydrogen filled 1-liter bomb. The catalyst components are then mixed under a nitrogen atmosphere. The catalyst components are used as diluted solutions in either n-heptane or Isopar E ® (a mixture of saturated isoparaffins having 8 to 9 carbon atoms). The polymerization reactions are carried out in a 5-liter stainless steel, stirred batch reactor at 150° C unless otherwise stated. In such polymerization reactions 2 liters of dry oxygen-free Isopar E ® are added to the reactor and heated to 150° C. The reactor is vented to about 30 psig and 15 to 25 psi of hydrogen is added for polymer molecular weight control. Then, 120 psi of ethylene is added to the reactor and the ethylene pressure is set to maintain the reactor pressure constant within the range from about 150 to 350 psig, usually 170 psig. The catalyst is then pressured into the reactor using nitrogen and the reactor temperature is maintained for the desired polymerization time. The polymerization reactor contents are dumped into a stainless steel beaker and allowed to cool. The resulting slurry is filtered and the polymer dried and weighed. The ethylene consumption during polymerization is recorded with a DP cell which shows the rate of polymerization and the amount of polymer produced.

EXAMPLE 1 [Titanium Complex]

A. Preparation of the Dinitrogen Complex

In a 500-ml round bottom flask a 15-g portion of $\Delta TiCl_3 \cdot \frac{1}{3} AlCl_3$ and 1.35 g di(n-butyl)magnesium.1/6 aluminum triethyl is mixed with 200 ml of Isopar E ® (a mixture of saturated isoparaffins having 8 or 9 carbon atoms) and refluxed at 120° C for two hours in a nitrogen atmosphere at atmospheric pressure. The delta titanium chloride activated with aluminum chloride ($\Delta TiCl_3 \cdot \frac{1}{3} AlCl_3$) is prepared by reducing $TiCl_4$ with metallic aluminum. The Isopar E ® is purged with nitrogen to remove oxygen and then dried with molecular sieves.

The reaction mixture is decanted and filtered to remove solid residue including unreacted $\Delta TiCl_3 \cdot \frac{1}{3} AlCl_3$. Analysis of the resulting filtrate for titanium and aluminum indicates 150 ppm Ti, less than 5 ppm Al and 2 ppm Mg. The filtered solid residue is added to another 200-ml portion of Isopar E ® and the foregoing procedure is repeated. The resultant filtrate contains 100 ppm Ti, less than 5 ppm Al and less than 5 ppm Mg. Analysis of the foregoing filtrates for nitrogen by Kjeldahl method and infrared spectroscopy indicates presence of nitrogen as Ti-N≡N ( II bonded).

B. Preparation of the Catalyst Composition

The catalyst composition is prepared by adding with stirring under a nitrogen atmosphere to a 4-ounce serum bottle the following components in the indicated order: 8.5 ml of 1.27 M ethyl aluminum sesquichloride in Isopar E ®, 80.5 ml of Isopar E ®, 3 ml of 1.09 M di(n-butyl)magnesium.1/6 triethyl aluminum in Isopar E ®, 8 ml of 150 ppm Ti (dinitrogen complex) in Isopar E ®. The temperature of the serum bottle is maintained at ambient temperature and reaction is observed to be complete after 5 minutes.

C. Polymerization

Into a stirred 5-liter jacketed stainless steel batch reactor is added two liters of Isopar E ®, 20 psig of hydrogen, 120 psig of ethylene, and 20 ml (12 ppm Ti) of the above catalyst composition. The temperature is controlled at 150° C and ethylene pressure is maintained constant at 120 psig. Total reaction time is 36 minutes yielding 103 grams of polyethylene indicating a catalyst efficiency of $9.3 \times 10^5$ grams of polymer per gram of Ti.

EXAMPLE 2 [Tungsten Complex]

A 2-g portion of $WCl_6$ was slurried with 200 ml of Isopar E ® in a liter stainless steel reactor under a dry nitrogen atmosphere. The reactor is pressured to 100 psig with $N_2$ and subsequently stirred for 2 hours at 120° C. The reactor is cooled down, contents allowed to settle, and the supernatant is removed with a syringe. Analysis of the supernatant by emission spectroscopy indicates 260 ppm tungsten.

A catalyst is prepared by mixing under $N_2$ at ambient temperature for 2 minutes in the following order (all solutions were in Isopar E ®):

A. 1 ml of 0.63 M ethyl aluminum sesquichloride,
b. 19.7 ml of Isopar E ®
c. 0.63 ml of 0.65 M di(n-butyl)magnesium.1/6 aluminum triethyl
d. 6.5 ml of 260 ppm as prepared above.

Polymerization is carried out according to general operating procedure using 25 milliliters of the above catalyst. The polymerization is terminated after 30 minutes and 70 grams of polyethylene are obtained giving a catalyst efficiency of $7.6 \times 10^5$ grams of polymer/gram W.

EXAMPLE 3 [Zirconium Complex]

A 2-g portion of $ZrCl_4$ is slurried with 200 ml of Isopar E ® in a liter stainless steel reactor under a dry nitrogen atmosphere. The reactor is pressured to 100 psig with $N_2$ and subsequently stirred for 2 hours at 120° C. The reactor is cooled, the contents allowed to settle, and the supernatant is removed with a syringe. Analysis of the supernatant by emission spectroscopy indicates 830 ppm Zr.

Catalyst is prepared by mixing in the manner of Example 2 in the following order (solutions in Isopar E ®):

a. 1.4 ml of 0.63 M ethyl aluminum sesquichloride
b. 36.3 ml of Isopar E ®
c. 1.7 ml of 0.36 M di(n-butyl)magnesium.1/6 aluminum triethyl
d. 0.64 ml of 830 ppm Zr as prepared above.

Polymerization is carried out according to the general operating procedure using 35 ml of the above catalyst. The polymerization is terminated after 35 minutes and 30 grams of polyethylene are obtained giving a catalyst efficiency of $9.4 \times 10^4$ grams of polymer/gram Zr.

EXAMPLE 4 [Dihydrogen Complex]

A 2-g portion of $\Delta TiCl_3 \cdot \frac{1}{3} AlCl_3$ as employed in Example 1 is slurried with 200 ml of Isopar E ® in a liter stainless steel reactor under a dry nitrogen atmosphere. The reactor was pressured to 100 psig with hydrogen (instead of $N_2$) and subsequently stirred for 2 hours at 120° C. The reactor is cooled, contents allowed to settle, and the supernatant is removed with a syringe. Analysis of the supernatant by emission spectroscopy indicates 1700 ppm Ti.

Catalyst was prepared by mixing under $N_2$ in the following order:

a. 2.8 ml of 0.63 M ethyl aluminum sesquichloride
b. 36 ml of Isopar E ®
c. 1.88 ml of 0.65 M di(n-butyl)magnesium.1/6 aluminum triethyl
d. 0.31 ml of 1700 ppm Ti as prepared above.

Polymerization is carried out using 10 ml of the above catalyst. The polymerization is terminated after 33 minutes and 54 grams of polyethylene (P.E.) were obtained giving a catalyst efficiency of $5.6 \times 10^5$ grams polymer/gram Ti.

EXAMPLE 5 [200° C Run]

An 18-pound portion of $\Delta TiCl_3.\frac{1}{3} AlCl_3$ as employed in Example 1 is slurried with 86 gallons of Isopar E ® and 1 liter of 0.8 M di(n-butyl)magnesium in a 100-gallon steel reactor under dry $N_2$ atmosphere. The reactor is pressured to 5 psig with $N_2$ and subsequently stirred for 3 hours at 120° C. The reactor is cooled, the contents are allowed to settle, and the supernatant is pressured out through a dip tube. Analysis of supernatant by emission spectroscopy indicates 1600 ppm Ti, <5 ppm Al and <1 ppm Mg.

Catalyst is prepared by mixing under $N_2$ the following (solutions in Isopar E ®):

a. 1.5 ml of 0.63 M ethyl aluminum sesquichloride
b. 37.2 ml of Isopar E ®
c. 0.94 ml of 0.65 M di(n-butyl)magnesium.1/6 aluminum triethyl
d. 0.34 ml of 1600 ppm Ti as prepared above.

Polymerization is carried out using 20 ml of the above catalyst and maintaining the reactor temperature at 197° C. The polymerization is terminated after 30 minutes and 75 grams of polyethylene are obtained, giving a catalyst efficiency of $3.9 \times 10^5$ grams polymer/gram Ti.

Example 6 [85° C Run]

A 450-g portion of $\Delta TiCl_3.\frac{1}{3} AlCl_3$ is slurried with 18 liters of Isopar E ® in a 25-liter round bottom flask. The flask and contents are refluxed for six hours under a nitrogen purge at 125° C. The flask is allowed to cool, the contents are allowed to settle, and the supernatant is removed with a syringe. Analysis of the supernatant by emission spectroscopy indicates 68 ppm Ti and <5 ppm Al.

Catalyst was prepared by mixing under $N_2$ in the following order (solutions in Isopar E ®):

a. 1.9 ml of 0.127 M ethyl aluminum sesquichloride
b. 39.7 ml of Isopar E ®
c. 6.4 ml of 0.026 M di(n-butyl)magnesium.1/6 aluminum triethyl
d. 2 ml of 68 ppm Ti as prepared above.

Polymerization is carried out using 20 ml of the above catalyst and maintaining the reactor temperature at 85° C. The polymerization is terminated after 71 minutes and 260 grams of polyethylene are obtained giving a catalyst efficiency of $6.6 \times 10^6$ grams polymer/gram Ti.

EXAMPLE 7 [$Zn(C_2H_5)_2$ as Divalent Organometallic]

A dinitrogen complex is prepared as in Example 5.
Catalyst is prepared by mixing under $N_2$ in the following order (solutions in Isopar E ®):

a. 1.4 ml of 0.63 M ethyl aluminum sesquichloride
b. 37.6 ml of Isopar E ®
c. 0.66 ml of 0.92 M diethyl zinc
d. 0.34 ml of 1600 ppm Ti as prepared above.

Polymerization is carried out using 10 ml of the above catalyst. The polymerization is terminated after 30 minutes and 45 grams of polyethylene are obtained giving a catalyst efficiency of $4.7 \times 10^5$ grams polymer/gram Ti.

EXAMPLE 8 [$(C_2H_5)AlCl_2$ as Halide Source]

A dinitrogen complex is prepared as in Example 5.
Catalyst is prepared by mixing under $N_2$ in the following order (solutions in Isopar E ®):

a. 0.72 ml of 1.31 M ethyl aluminum dichloride
b. 38 ml of Isopar E ®
c. 0.94 ml of 0.65 M di(n-butyl)magnesium.1/6 aluminum triethyl
d. 0.34 ml of 1600 ppm Ti as prepared above.

Polymerization is carried out using 10 ml of the above catalyst. The polymerization is terminated after 30 minutes and 160 grams of polyethylene are obtained giving a catalyst efficiency of $1.7 \times 10^6$ grams polymer/gram Ti.

EXAMPLE 9 [$(C_2H_5)_2AlCl$ as the Halide Source]

A dinitrogen complex is prepared as in Example 5.
Catalyst is prepared by mixing under $N_2$ in the following order (solutions in Isopar E ®):

a. 1.54 ml of 1.23 M diethyl aluminum chloride
b. 36.2 ml of Isopar E ®
c. 1.88 ml of 0.65 M di(n-butyl)magnesium.1/6 aluminum triethyl
d. 0.34 ml of 1600 ppm Ti as prepared above.

Polymerization is carried out using 10 ml of the above catalyst. The polymerization is terminated after 30 minutes and 153 grams of polyethylene are obtained, giving a catalyst efficiency at $1.6 \times 10^6$ grams polymer/gram Ti.

EXAMPLE 10 [Titanium Complex]

A 5-g portion of alpha $TiCl_3$ (containing no $AlCl_3$) is slurried with 200 ml Isopar E ® in a liter stainless steel reactor under a dry nitrogen atmosphere. The reactor is pressured to 100 psig with $N_2$ and subsequently stirred for 2 hours at 120° C. The reactor is cooled, the contents are allowed to settle, and the supernatant is removed with a syringe. Analysis of the supernatant by emission spectroscopy indicates 320 ppm Ti. This compares to 4000 ppm Ti on a duplicate preparation in which $\Delta TiCl_3$ containing $AlCl_3$ is used.

Catalyst is prepared by mixing under $N_2$ in the following order (solutions in Isopar E ®):

a. 4.7 ml of 0.127 M ethyl aluminum sesquichloride
b. 9.1 ml of Isopar E ®
c. 10.2 ml of 0.036 M di(n-butyl)magnesium.1/6 aluminum triethyl
d. 1 ml of 320 ppm Ti as prepared above.

Polymerization is carried out using 10 ml of the above catalyst. The polymerization is terminated after 30 minutes and 108 grams of polyethylene are obtained giving a catalyst efficiency of $1.2 \times 10^6$ grams polymer/gram Ti.

EXAMPLE 11

A 450-g portion of $\Delta TiCl_3.\frac{1}{3} AlCl_3$ is slurried with 18 liters of Isopar E ® in a 25-liter flask. The flask is refluxed 6 hours at about 125° C under an $N_2$ purge, then allowed to cool and settle. Analysis of the supernatant indicates 500 ppm Ti, <5 ppm Al. This supernatant is distilled and the second fraction distilling at 121°–124°

C retained for subsequent use. Analysis of this fraction by emission spectroscopy indicates 480 ppm Ti and <5 ppm Al.

A 25-ml portion of 1.27 M ethyl aluminum sesquichloride is reacted with 87.2 ml of di(n-butyl)magnesium. The precipitate is filtered and washed with Isopar E ®, then mixed with Isopar E ® to form a slurry. Analysis of the slurry by emission spectroscopy indicates 3800 ppm Mg and 430 ppm Al. Catalyst is prepared by mixing under $N_2$ in the following order (solutions in Isopar E ®):

a. 2.8 ml of 3800 ppm Mg slurry
b. 19.75 ml of Isopar E ®
c. 0.6 ml of 480 ppm Ti
d. 1.85 ml of 0.024 M tri-n-decyl aluminum.

Polymerization is carried out using 10 ml of the above catalyst. The polymerization is terminated after 30 minutes and 163-g of polyethylene are obtained, giving a catalyst efficiency of $2.0 \times 10^6$ grams polymer/gram Ti.

EXAMPLE 12 [Propylene Copolymer]

A dinitrogen complex is prepared as in Example 5.

Catalyst is prepared by mixing under $N_2$ in the following order (solutions in Isopar E ®):

a. 10.75 pounds Isopar E ®
b. 6.75 pounds of 15 percent ethyl aluminum sesquichloride
c. 7 pounds of 0.7 M di(n-butyl)magnesium.1/6 aluminum triethyl
d. 3.5 pounds of 1600 ppm Ti as prepared above.

Ethylene is polymerized in a stirred 5-liter continuous reactor at 150° C and 500 psig. Feed rates are 103 pounds/hour of ethylene and 12 pounds/hour of propylene. Ninety pounds of copolymer is produced per hour, giving a catalyst efficiency of $1.74 \times 10^6$ pounds P.E./pound Ti. The copolymer has a density of 0.9469, a $M_w = 37,100$ and a $M_n = 13,400$.

EXAMPLE 13 [Plant Run]

A dinitrogen complex is prepared as in Example 5.

Catalyst is prepared by mixing under $N_2$ in the following order (solutions in Isopar E ®):

a. 75.25 pounds of Isopar E ®
b. 47.25 pounds of 15 percent ethyl aluminum sesquichloride
c. 54.25 pounds of 0.7 M di(n-butyl)magnesium.1/6 aluminum triethyl
d. 24.5 pounds of 1200 ppm Ti as prepared above.

Ethylene is polymerized in a 5000-gallon stirred continuous reactor at 155° C and 450 psig. Six thousand six hundred pounds of polyethylene per hour were produced, giving a catalyst efficiency of $1.5 \times 10^6$ pounds polymer/pound Ti. The polymer has a density of 0.9665 and $M_w/M_n = 3.56$ ($M_w/M_n$ of 2.5–5 indicates very narrow molecular weight distribution) and its color with catalyst remaining is as good as the color of polymer made using elaborate catalyst removal steps.

What is claimed is:

1. A catalytic reaction product of (A) a hydrocarbon-soluble complex of a halide of a transition metal selected from Groups 4b, 6b, 7b and 8 of the Periodic Table wherein the complex contains at least one coordinate covalent bond to molecular nitrogen or hydrogen, (B) an organometallic compound wherein the metal thereof is a divalent non-transition metal selected from Groups 2a and 2b of the Periodic Table and the organo portion of said organometallic compound is selected from alkyl, aryl, dialkyl, diaryl, aryl hydride, alkyl hydride, alkyl halide and aryl halide, and (C) a halide source selected from the group consisting of (1) hydrogen halides, (2) active organic hydrocarbyl halides and (3) metallic halides represented by the formula $MR_{y-a}X_a$ wherein M is a metal of Group 3a or 4a, R is a monovalent organic hydrocarbyl radical, X is a halogen, Y corresponds to the valence of M and $a$ is a number from 1 to $y$, the proportions of the foregoing components of said catalytic reaction product being such that the atomic ratio of the divalent nontransition metal to the transition metal is within the range from about 10:1 to about 2000:1, and the atomic ratio of the divalent metal to X is within the range from about 0.1:1 to about 2.5:1.

2. The reaction product of claim 1 wherein the organometallic compound is a dihydrocarbyl magnesium and the catalytic reaction product contains sufficient aluminum compound as the halide source such that the ratio of aluminum to transition metal is at least 4:1.

3. The reaction product of claim 1 wherein the organometallic compound is dialkyl magnesium which is combined with a trialkyl aluminum to form a hydrocarbon soluble complex represented by the formula: $MgR''.XAlR_3''$ wherein R'' is alkyl and X is 0.01 to 10.

4. The reaction product of claim 2 wherein the halide source is an alkyl aluminum halide.

5. The reaction product of claim 3 wherein the halide source is a non-metallic halide corresponding to the formula R'X wherein R' is hydrogen or an active monovalent organic hydrocarbyl radical and X is halogen.

6. The reaction product of claim 1 wherein the complex of the transition metal is a dinitrogen complex of a transition metal halide.

7. The reaction product of claim 6 wherein the transition metal halide is a titanium halide.

8. The reaction product of claim 7 wherein the titanium halide is $ATiCl_3.\frac{1}{3} AlCl_3$.

9. The reaction product of claim 1 wherein the complex is a dinitrogen complex of a titanium chloride, the organometallic compound is an organomagnesium compound of the empirical formula $R_2Mg$ wherein R is alkyl or aryl and the halide source is an alkyl aluminum halide.

10. A process for preparing the reaction product of claim 1 wherein the organometallic compound of the divalent non-transition metal is reacted with the halide source to form an intermediate reaction product which is then reacted with the dinitrogen complex to form the desired catalytic reaction product.

* * * * *